Carter & Mets,
Table Slide.
No. 4,317. Reissued Apr. 4. 1871.
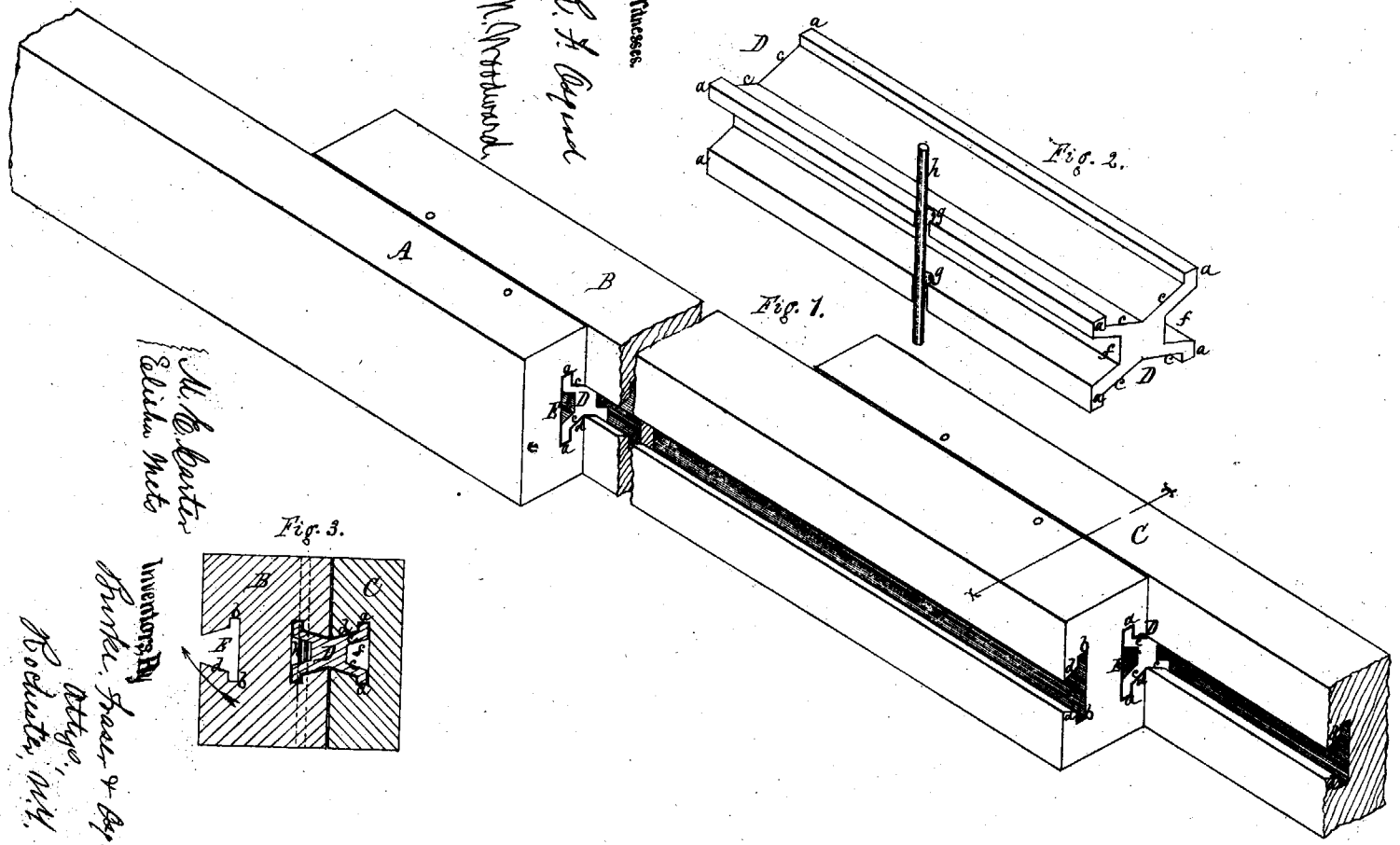
Witnesses.
R. F. Osgood
C. N. Woodward.
M. E. Carter
Elisha Mets
Inventors, By
Burke, Fraser & Osgood,
Attys.,
Rochester, N.Y.
N. PETERS, PHOTO-LITHOGRAPHER, WASHINGTON, D. C.

United States Patent Office.

MERRILL E. CARTER, OF SYRACUSE, AND ELISHA METS, OF ROCHESTER, NEW YORK; ELISHA METS, ASSIGNOR, BY MESNE ASSIGNMENTS, TO HAYDEN & HAHN.

Letters Patent No. 44,073, dated September 6, 1864; reissue No. 4,317, dated April 4, 1871

IMPROVEMENT IN SLIDES FOR EXTENSION-TABLES.

The Schedule referred to in these Letters Patent and making part of the same.

*To all whom it may concern:*

Be it known that we, MERRILL E. CARTER, of Syracuse, in the county of Onondaga, State of New York, and ELISHA METS, of Rochester, in the county of Monroe and State aforesaid, have invented a certain new and useful Improvement in the Slides of Extension-Tables, of which the following is a specification.

*Nature of the Invention.*

This invention consists in the form and construction of the slide, and the means for connecting the same with the extension bars, as hereinafter described.

*General Description.*

In the drawing—

Figure 1 is a perspective view of the bars of an exsion-table provided with our improvement.

Figure 2, a similar view of one of the slides detached, showing also the pin-fastening.

Figure 3, a cross-section of two of the bars and one of the slides that connect them.

A B C are three sliding-bars, that support the leaf of an extension-table. A greater or lesser number may be employed, as may be desirable. These bars are placed side by side in the usual way.

Longitudinal grooves, E E, are cut centrally in their contiguous sides, in which rest the slides D D, which form the subject of our invention.

The slides are secured, respectively, to each bar, at each end of the same and on opposite sides. Thus, when the bars are fully extended or drawn out, the slides form stops to each other on the contiguous bars.

These slides are of peculiar construction and form. The central or core portion is made double-wedging or dovetailed, as shown at *c c*, the narrowest or thinnest point being in the center, which is the junction or joint between the two bars.

The dovetailed or thickened sides thus rest in the correspondingly-shaped grooves *d d* made in the sides of the bars.

The outer portions of the slide are formed into two extended or branching tongues, *a a*, which are of T-form, and fit in corresponding channels, *b b*, of the groove E.

This construction makes the bearings *a a* broad and separated, which is of much importance, to give a firm hold and steadiness of action.

A hollow space or depression, *f*, is left in each head, which not only reduces the metal but leaves less friction on the contact surfaces and produces an improved form of the slide, at the same time forming a large bearing.

We claim a novelty in the improved form of the slide, as above described.

A simple double T-form of the slide was in common use before our invention. Simple dovetailed slides, without the T-flanges, have also been in common use.

These separate features we do not claim; but in their combined form we obviate many difficulties, such as binding in the groove and the splitting out of the tongues of wood.

The broad bearing produced by the separated flanges *a a* insures a more perfect action than is attained by the ordinary T-form.

To secure the slides firmly to the wood, we make the tongues or flanges *a a* a little thicker on one side than on the other, so that they will drive closely into the groove, in which they are designed to remain stationary.

Each slide is formed with a notch or hole, *g*, fig. 2, in which rests a pin, *h*, passing through the bar. It will be seen that this keeps the slide from moving endwise in either direction and holds it firmly in place.

The pins may be easily produced by cutting off pieces of wire, or in any other way.

The advantage of this method of securing a slide is obvious.

Much time and labor are saved by avoiding any drilling of screw-holes and applying of screws, as is ordinarily done.

We also avoid the expense of screws, which, however insignificant in cost in the single device, amounts to a large sum in the aggregate in a large manufacture.

In addition to this, the pin, by passing through the whole bar, or a large portion of the same, has a greater hold and gives a greater stiffness and strength than can be produced by the use of screws, which are liable to be torn from place by the concussion, especially as the slide attaches to but one bar and runs free upon the other.

The single pin, resting in the notch or hole of the slide and passing through the bar, obviates all difficulty of this kind.

*Claims.*

What we claim as our invention is—

1. A metallic connecting-slide, D, with flanges, to be inserted in the grooves E E of the wooden bars A B C, when constructed, arranged, and operating in the manner and for the purpose specified.

2. A metallic connecting-slide, D, for the bars of extension-tables, having the flanges on one side cast thicker than upon the other, so as to hold fast in the groove of one bar and slide free in the groove of the other, as herein described.

3. The pin *h* and notches or holes *g*, when combined with and used to hold a metallic connecting-slide, D, in its proper position in the groove E of the bars of an extension-table, as herein specified.

In witness whereof we have hereunto set our hands this 1st day of February, 1871.

M. E. CARTER.
E. METS.

Witnesses:
C. W. SMITH,
R. FRISETTE.